United States Patent

[11] 3,608,023

[72] Inventor Donald D. Scarborough
Redington Shores, Fla.
[21] Appl. No. 855,230
[22] Filed Sept. 4, 1969
[45] Patented Sept. 21, 1971
[73] Assignee The United States of America as represented by the United States Atomic Energy Commission

[54] ENCAPSULATING METHOD
1 Claim, 4 Drawing Figs.

[52] U.S. Cl. .......... 264/102, 264/101, 264/272
[51] Int. Cl. .......... B29c 6/02
[50] Field of Search .......... 264/272, 101, 102

[56] References Cited

UNITED STATES PATENTS

| | | | |
|---|---|---|---|
| 2,517,902 | 8/1950 | Luebkeman | 264/102 X |
| 2,941,905 | 6/1960 | Hofmann | 264/101 X |
| 3,305,614 | 2/1967 | Parsons | 264/101 X |

FOREIGN PATENTS

| | | | |
|---|---|---|---|
| 1,162,999 | 1964 | Germany | 264/102 |
| 989,124 | 1961 | Great Britain | 264/272 |

*Primary Examiner*—Robert F. White
*Assistant Examiner*—Richard R. Kucia
*Attorney*—Roland A. Anderson

ABSTRACT: Method for encapsulating components utilizing individually evacuatable molds for receiving the components which may be separated and removed from the means evacuating the mold without loss of vacuum and positioned within an evacuated chamber where the molds may be opened and the component encapsulated under vacuum. The mold with encapsulated component may thereafter be subjected to atmospheric pressure and the encapsulant cured.

*INVENTOR.*
DONALD D. SCARBOROUGH
*BY*

ENCAPSULATING METHOD

BACKGROUND OF THE INVENTION

Electrical and electronic components and equipment, such as transformers, electron tubes, circuits, etc., are commonly encapsulated or impregnated with synthetic resin materials to increase electrical holdoff strengths and to protect the components and equipment from possibly detrimental environmental affects which might cause failures of some sort. It is important in the encapsulating process to eliminate or minimize contaminates, voids or bubbles within the encapsulant, which may provide relatively low resistant paths for electrical shorts or arcs. This problem becomes even more critical in present day miniturization and microminiturization techniques where even the smallest size defect in the encapsulant may provide a direct, relatively low resistance path between points at different potentials.

As microminiaturization increasingly places these high demands on insulation dielectric strengths, there is a need to provide improved control of the encapsulating process, especially since many of these defects are so small that they may not be readily detectable until the component or equipment is subjected to actual use and a failure occurs. Even then, the defect may not cause a failure except under certain environmental conditions.

Such defects may be minimized by degassing the component or equipment under a vacuum and then encapsulating the component or equipment while maintaining the vacuum. If the vacuum is not maintained continuously until encapsulation is complete, contaminants may reenter the components. The apparatus required to evacuate, degas and encapsulate may be very expensive and bulky and the time required to perform these functions may be relatively long. As the number of components or equipment to be encapsulated increases, the size and cost of the apparatus may also increase proportionately. Further, since the degassing portion of the process requires a substantially longer period of time than the encapsulating portion, the overall encapsulating system may make highly inefficient use of the process apparatus.

SUMMARY OF INVENTION

It is therefore an object of this invention to provide a novel encapsulating method.

It is a further object of this invention to provide an encapsulating method capable of simultaneously processing a plurality of separate components or equipment.

It is a further object of this invention to provide an encapsulating method which may encapsulate evacuated and degassed components on a production line basis.

It is a further object of this invention to provide an encapsulating method capable of maintaining evacuation of components throughout the process.

Various other objects and advantages will appear from the following description of one embodiment of the invention, and the most novel features will be particularly pointed out hereinafter in connection with the appended claims.

The invention comprises an encapsulating method utilizing separately evacuated, sealed and degassed molds and an evacuatable encapsulating material dispenser for encapsulating components in the molds without loss of vacuum.

DETAILED DESCRIPTION

Figures 1A, 1B, 1C, 1D:
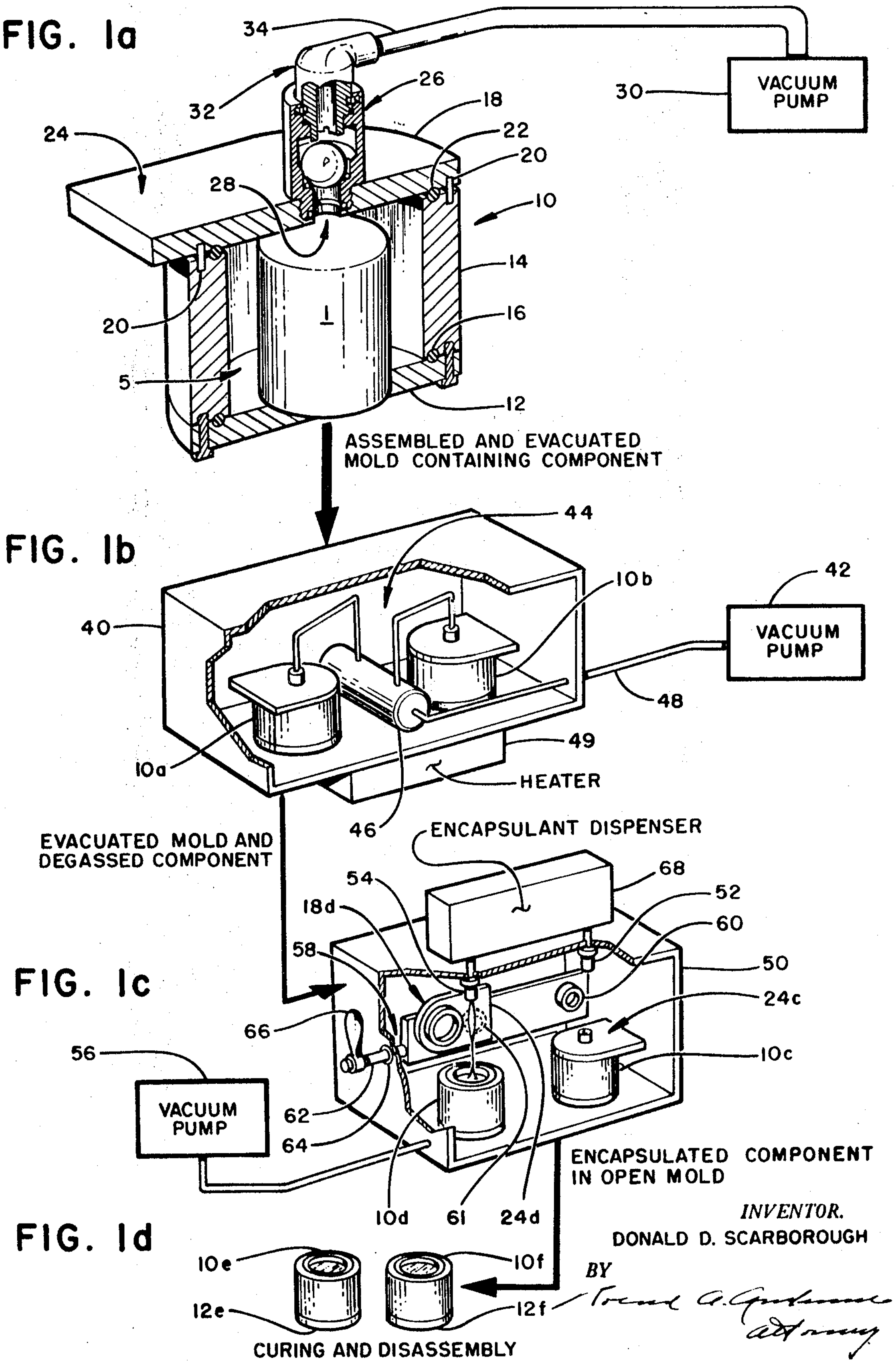
FIGS. 1*a*–1*d* of the drawing illustrate the separate process apparatus and process steps in somewhat simplified and diagrammatic views, cross-sectional and perspective views.

The present encapsulation system utilizes a unique component mold and check valve arrangement as a vacuum drying or degassing chamber as well as the encapsulating mold. Once the mold and component have been evacuated, the component is maintained under a continuous vacuum throughout the process until the encapsulation has been completed.

The component or apparatus to be encapsulated may first be positioned within a partially assembled mold appropriately shaped and sized to the component at a first location or assembly station. Referring to FIG. 1*a*, a component 1, generally show for purpose of illustration as a cylinder but which may be a transformer, electrical circuit, or the like, may be suitably positioned within the encapsulating cavity 5 of mold 10. Mold 10 includes a removable end plate 12 which may be fastened with bolts or other fasteners to the annular or otherwise shaped sidewalls 14 and vacuum sealed thereto by a suitable gasket 16 such as an O-ring of rubber or the like. End plate 12 facilitates removal of the encapsulated component after encapsulating. Walls 14 and end plate 12 may be formed as a unitary member where the application so warrants. Gasket 16 may be disposed with annular grooves as shown or between other appropriate surfaces of the mating portions of end plate 12 and sidewalls 14. Component 1 may be maintained in any desired position or attitude within mold 10 with appropriate spacers (not show), as needed. With component 1 positioned in cavity 5 of mold 10 as show, cover plate 18 may be laid over and aligned so as to cover the cavity, appropriately placed alignment pins 20 may be used to aid in alignment. A continuous gasket 22, such as an O-ring of rubber or the like, may be disposed between cover plate 18 and sidewalls 14 along appropriate mating portions thereof which with certain configurations may provide additional alignment. For convenience, gasket 22 may be attached to and carried by cover plate 18.

Cover plate 18 may be shaped in any desired configuration generally conforming with the shape of sidewalls 14 which will provide the necessary coverage and sealing of the mold cavity and may include an extended portion 24 to facilitate later removal of the cover plate just prior to encapsulation as described below with respect to FIG. 1*c*. Cover plate 18 is also provided with a suitable check valve 26, such as the ball-type valve shown or other conventional vacuum operable check valve, communicating with the mold cavity 5 through passageway 28. Check valve 26 automatically closes and seals whenever the pressure within the mold cavity is lower than the pressure on the other side of the valve closure.

With the mold and component assembled as shown, a vacuum pump 30 may be coupled to the mold cavity through check valve 26 with a suitable coupling or connector 32 and vacuum tubing 34. Coupling 32 may be any appropriate plug-in type coupling which maintains a good vacuum seal when inserted in or connected to check valve 26 and which may be readily released therefrom.

With the assembly of mold 10 and the vacuum system complete, the mold cavity may be evacuated and a seal simultaneously effected between cover plate 18 and sidewalls 14 via gasket 22. An initial hand pressure seal may be required to initiate evacuation. As the vacuum within the mold cavity increases, cover 18 may be pulled down tighter over gasket 22 to effect a complete seal. It should be understood that the only sealing pressure applied to cover plate 18 after an initial seal has been effected until the encapsulation portion of the process begins is atmospheric pressure.

When the desired seal and vacuum level in mold 10 is achieved, which may be 10 torr or lower, the vacuum system may be separated from mold 10 by disconnecting coupling 32 from check valve 26. Check valve 26 will then automatically seal and maintain the vacuum within the mold cavity. If it is desired, the leak rate into mold 10 may be checked by appropriate leak rate detectors through check valve 26. More than one mold and component may be simultaneously assembled, evacuated and checked by use of a common vacuum system with a vacuum manifold and tubing arrangement (not shown) in FIG. 1*a*.

The molds so assembled and evacuated may be further processed at a second location or station as illustrated in FIG. 1*b*. At this station, one or more assembled and evacuated molds, such as molds **10*a* and 10*b*, may be positioned within a suitable furnace enclosure 40 (shown with its front end wall or door removed) and connected to a vacuum pump 42 through separate vacuum tubing 44, manifold 46 and tubing 48**.

Vacuum tubing 44 may be connected to the individual check valves in molds 10*a* and 10*b* through couplings of the same type and in the same manner shown in FIG. 1*a*.

With molds 10*a* and 10*b* connected to the vacuum system, furnace enclosure 40 may be heated by heater 49 to an appropriate temperature to assist in degassing of the components within molds 10*a* and 10*b*. In a typical operation, the molds and components may be heated to a temperature of from about 130° to 160° or higher for periods ranging from 2 to 24 hours or longer while maintaining or even increasing the initial vacuum.

After the component has been degassed as determined by suitable monitoring equipment in the vacuum system or by a preselected degassing period, the molds may be disconnected from the vacuum system by unplugging the releasable couplings from the mold check valves and removed from furnace enclosure 40. The still evacuated molds and now degassed components may be transported to an appropriate evacuatable chamber 50 (shown with its sidewall or door removed) at a third station or location, as illustrated in FIG. 1*c*. The molds, such as molds 10*c* and 10*d*, may be positioned within chamber 50 directly below encapsulant injection or supplying nozzles 52 and 54. Chamber 50 may then be closed and sealed and the interior thereof evacuated by vacuum pump 56. When chamber 50 is evacuated to a pressure generally near that of the vacuum within molds 10*c* and 10*d*, the dover plates of the molds may be readily removed by pickup arm 58. Pickup arm 58 includes a permanent or electrical magnet, such as magnets 60 and 61, for each mold within chamber 50 and is rotatably mounted within the chamber by a shaft 62, vacuum sealed bearings 64 and handle 66. With the vacuum within the chamber and molds being approximately equal, pickup arm 58 may be rotated to a position with the magnets adjacent the mold cover plates and the cover plates removed by the attraction of the magnets to portion 24 of the mold cover plate. The position and shape of arm 58 and position of magnets 60 and 61 should be to permit engagement of the magnets with portion 24 without any obstruction from the check valves.

With the cover plates removed, as shown by cover plate 18*d* of mold 10*d*, the encapsulant material may be injected or fed into the open mold from the encapsulant dispenser 68 and appropriate injection nozzles while still maintaining the vacuum in chamber 50. Dispenser 68 may be any automatic or semiautomatic synthetic resin or other encapsulant dispenser which may mix and feed the resins or other encapsulants into an evacuated chamber. Suitable encapsulants may include epoxies and the like and certain types of glass depending on the desired encapsulant properties.

Once the component in each of the molds in chamber 50 is completely covered or submerged by the encapsulant, chamber 50 may be returned to atmospheric pressure and the encapsulated component and open mold removed therefrom and transported to a fourth station or location for curing. The atmospheric pressure about the mold may provide a compressive pressure against the encapsulant and force it more completely into and around the component. The encapsulant may be cured in a well known manner at room temperature or above for a period of time depending on the encapsulating materials and mix. After curing, the end plate 12 of each mold, such as end plates 12*e* and 12*f* of molds 10*e* and 10*f*, illustrated in FIG. 1*d*, may be disassembled and the encapsulated component removed from the mold.

It will be readily apparent that the various stations or locations of this system may be operated to provide a production line operation merely by adjusting the mold handling capacity of each station or location. For example, due to the long term nature of the process associated with the second and fourth stations, these stations should include a capacity for handling a relatively large number of molds.

This system may be readily adapted to encapsulate a wide range of components and apparatus by selection of the proper size and shape mold with different mold designs and components being processed simultaneously. Further, vacuum pumps 30, 42 and 56 may be separate pumps or they may be a single vacuum pump connected to a vacuum distribution system connected to the separate stations.

The present system provides method and apparatus for encapsulating components with appropriate encapsulants where the components are initially vacuum degassed and dried and then maintained under a vacuum until the components are completely submerged. This entire encapsulation may be achieved with efficient use of process equipment without subjecting the once degassed components to contaminating atmospheres.

It will be understood that various changes in the details, materials and arrangements of the parts, which have been herein described and illustrated in order to explain the nature of the invention, may be made by those skilled in the art within the principles and scope of the invention as expressed in the appended claims.

1. A method of encapsulating components comprising positioning a component within an individual mold interior, overlying the individual mold with an individual mold cover against a gasket intermediate cover and mold, said cover having a check valve communicating with the interior of the mold; evacuating the mold interior through said check valve drawing the overlying cover against said intermediate gasket hermetically sealing the mold, then while so sealed heating the mold and simultaneously further evacuating the individual mold interior and component through said check valve to vacuum dry and degas the mold interior and component, and thereafter disconnecting said vacuum from said check valve and maintaining the vacuum in said individual mold interior with said individual overlying cover, gasket and check valve; establishing a vacuum about the still evacuated mold to a vacuum near the vacuum within said mold, opening the mold by lifting said individual cover therefrom while under said vacuum when the vacuum inside and outside said mold substantially equalize to thereby fully expose an open mouth of the mold and the component, and maintaining said vacuum around the uncovered mold and now exposed component while simultaneously filling the mold with an encapsulating material to submerge the component; and thereafter exposing said encapsulating material filled mold with submerged component to atmospheric pressure, curing said encapsulating material, and removing the encapsulated component from the mold.